United States Patent [19]

Lewis

[11] 4,401,626
[45] Aug. 30, 1983

[54] SPRAY DEVICE USEFUL IN CARBON BLACK REACTOR

[75] Inventor: Robert J. Lewis, Hopkins, Minn.

[73] Assignee: Phillips Petroleum Company, Bartlesville, Okla.

[21] Appl. No.: 39,930

[22] Filed: May 17, 1979

[51] Int. Cl.³ .......................... C01B 49/00; C09C 1/48
[52] U.S. Cl. ...................................... 422/151; 55/223; 55/238; 261/118; 239/432; 239/558
[58] Field of Search ............... 422/150, 151; 239/432, 239/558; 261/118; 55/223, 238 D; 208/48 Q

[56] References Cited

U.S. PATENT DOCUMENTS 3,222,136 12/1965 Hess et al. ..................... 422/151
3,369,870 2/1968 Ganz et al. .................... 423/450
4,138,217 2/1979 Slagel et al. ................. 422/150 X

FOREIGN PATENT DOCUMENTS 2330865 8/1976 France .

Primary Examiner—Michael S. Marcus

[57] ABSTRACT

A tubular member having a plurality of discharge openings along its length and having means by which it can be inserted into a quench zone so that fluid is discharged in a patterned spray generally transversely across the quench zone. The tubular member having baffle plates attached thereto or fixed adjacent thereto with the baffle plates of sufficient size and shape to fill the spaces between patterned spray thereby directing into the patterned spray the material flowing axially through the quench zone. A method and apparatus for producing uniform carbon black particles using a quench pipe as described above in the prequenching zone of a carbon black reactor.

4 Claims, 4 Drawing Figures

SPRAY DEVICE USEFUL IN CARBON BLACK REACTOR

BACKGROUND OF THE INVENTION

This invention relates to quench pipes. In another of its aspects this invention relates to contacting quench fluid discharged from a quench pipe with material flowing through a quench zone. In another of its aspects this invention relates to the production of carbon black. In still another aspect of the invention it relates to the directing of flow of material in a quench zone.

Quench pipes which have two sets of orifices along the pipe, with the sets of orifices being a 180° apart, so that fluid can be discharged in a patterned spray generally transversely across a quench zone, are well known in the art. This kind of quench pipe as is set forth in copending application Ser. No. 764,665, filed Feb. 1, 1977, now U.S. Pat. No. 4,138,217, is often used in carbon black reactors to provide a curtain of quenching fluid through which hot smoke is passed thereby instantly cooling the smoke to approximately the same temperature. If all the particles could be cooled to the same temperature to produce uniform particles the resulting carbon black would have excellent tinting strength. Unfortunately, most of the spray systems known in the art provide voids between the spray patterns emanating from the orifices located along the pipe. These voides allow hot smoke to pass the quench zone thereby aggravating the nonuniformity of carbon black particles formed in the process. The present invention seeks to eliminate this problem by providing means by which the hot smoke is directed into the sprayed coolant fluid.

It is therefore an object of this invention to provide apparatus and method by which material passing axially through a quench zone is directed into transverse sprays of coolant fluid. It is another object of this invention to provide method and apparatus for producing carbon black particles that are more uniform and therefore have a higher tinting strength. It is still another object of this invention specifically to provide a quench pipe having baffle means attached thereto which can be readily installed or removed from a quench zone.

Other aspects, objects and the various advantages of this invention will become apparent upon reading this specification along with the appended claims and the drawings.

STATEMENT OF THE INVENTION

In accordance with this invention, a tubular member, or quench pipe, is provided which has a plurality of discharge openings along its length with means for inserting the quench pipe into a quench zone so that fluid is discharged in a patterned spray generally transversely across the quench zone. The tubular member has baffle plates aligned therewith—attached thereto or fixed adjacent thereto—that are of sufficient size, shape and placement substantially to fill the spaces between the patterned spray so that axial flow through the quench zone is directed into the patterned spray.

In another embodiment of the invention a method is provided for directing axial flow through a quench zone into contact with a patterned spray ejected generally transversely across the axial flow pattern in a quench zone from a tubular member having a plurality of discharge openings along its length and redirecting axial flow by means of baffles in the spaces between the patterned spray that are sufficiently sized and shaped to direct the axial flow into contact with the patterned spray.

In another embodiment of the invention apparatus and method for producing carbon black in a reacting vessel are provided having suitable means by which feed and combustion gases are mixed in a precombustion zone to produce a combustion mixture which is passed to a reaction zone under conditions sufficient for combustion, downstream of the combustion zone the combusted mixture is subjected to a prequench using the apparatus and method of this invention thereby lowering the temperature of the reactant sufficiently to stop the formation of carbon black; optionally, downstream the mixture is subjected to an additional quench and the quenched reaction product is removed from the reactor.

Reference is made to application Ser. No. 764,665, filed Feb. 1, 1977. In that application a quench pipe for use in carbon black production is disclosed which can have two longitudinal grooves on the pipe surface. These grooves are located 180° apart. Within the grooves are spaced orifices from which emanates quench liquid for prequenching hot carbon black contained in reactor smoke. The quench pipe is mounted across a diameter of the carbon black reactor in a manner so that the prequench water forms a "curtain" generally transverse to the axial flow of smoke through the reactor through which the hot smoke is passed so that it can be cooled below about 2200° F. which is the lowest temperature at which carbon black formation occurs.

The present invention modifies a quench pipe such as that described above, which has two sets of orifices along the pipe with the two longitudinally spaced sets of orifices being 180° apart by adding baffle means along the pipe between longitudinally adjacent orifices. These baffle means minimize the bypassing of the "curtain" of quench fluid by the hot smoke. In other words the baffle means prevent the hot smoke from passing through an area void of quench fluid near the pipe between the spray patterns produced by two longitudinal orifices.

As will be shown in the drawing, although the preferred shape of the baffle means is a triangular configuration any other desired geometric configuration such as semicircular, trapezoidal, etc., can be used. Various shapes can be used on the same quench pipe.

The material of construction of the baffle means is limited only in that the baffles must withstand temperatures in a range above 2200° F. up to about 3500° F., or even higher. Presently preferred are baffles of ceramic material or of metal coated with ceramic.

Since, in general, in the operation of a carbon black process installation or removal of quench pipes requires rapid connection, the usual reactor will have means for installing quench tubes at a variety of locations along the reactor and will require flange connectors that enable rapid connection. Obviously, a quench pipe having elongated baffle means attached thereto will require an elongated opening on the side of the reactor through which the baffled quench pipe can pass and will also require the use of an elongated flange means for closing the reactor.

The invention can best be understood by reference to the drawing in which

Figure 1:
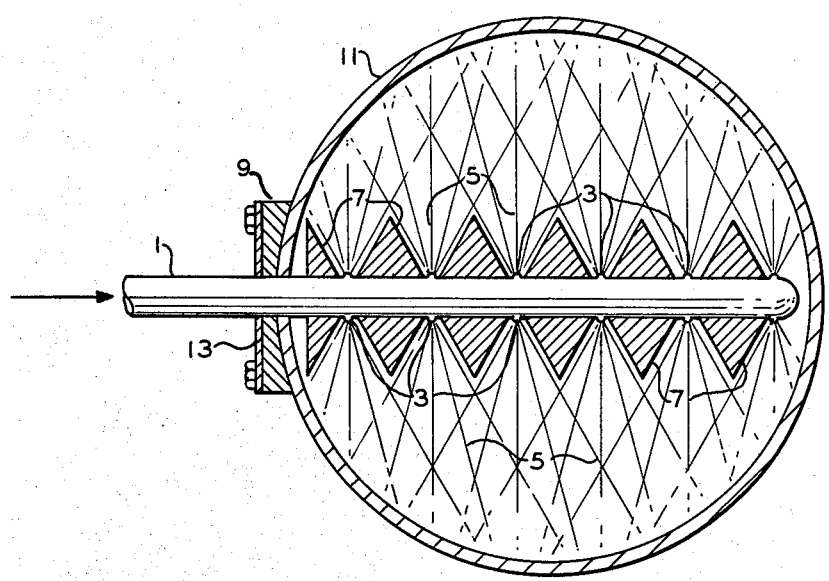
FIG. 1 is a cross section of a reactor with the quench pipe of this invention installed.

Referring now to the drawings, in FIG. 1 a quench fluid passes into a quench pipe 1 from an external source and is sprayed through nozzles 3 which are appertures in the pipe located 180° apart along the length of the pipe to produce a patterned "curtain" of sprayed quench fluid 5 that is generally transverse the axial flow of material passing through the reactor. Under the circumstances of the prior art the area between the patterns of sprayed quench fluid would be voids through which axial flow could pass unhampered. By this invention these voids are, at least partially, filled with baffle means 7 which divert axially flowing material into patterned spray 5.

There is an elongated conduit 9 attached to the shell or sidewall of the reactor 11 by which the elongated flange cover 13 attached to quench pipe 1 is used to position and maintain quench pipe 1 in place.

Figure 2:
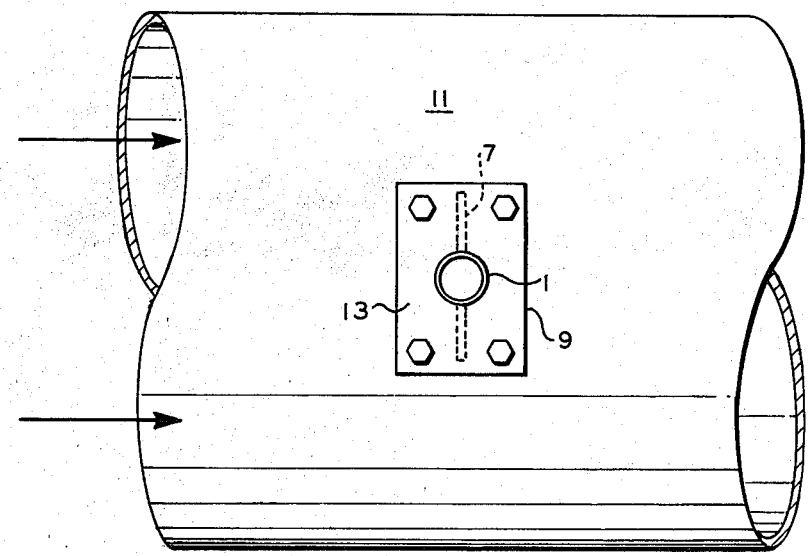
FIG. 2 is a side view of a reactor pipe showing an external view of the elongated flange necessary for installing quench pipe.

Referring now to FIG. 2, it can be seen that elongated conduit 9 must be sufficiently larger than the total length of the baffle means 7 attached to quench pipe 1 and flange cover 13 to allow easy entrance and exit of the baffled quench pipe through the shell or sidewall 11 of the reactor. The arrows indicating axial flow of material through the reactor pipe indicate the general alignment of the baffle plates with spray nozzles in between to be generally transverse the direction of flow of material through the reactor. Sidewall 11 is shown schematically and is usually a steel shell with refractory liner, not shown.

Figure 3:
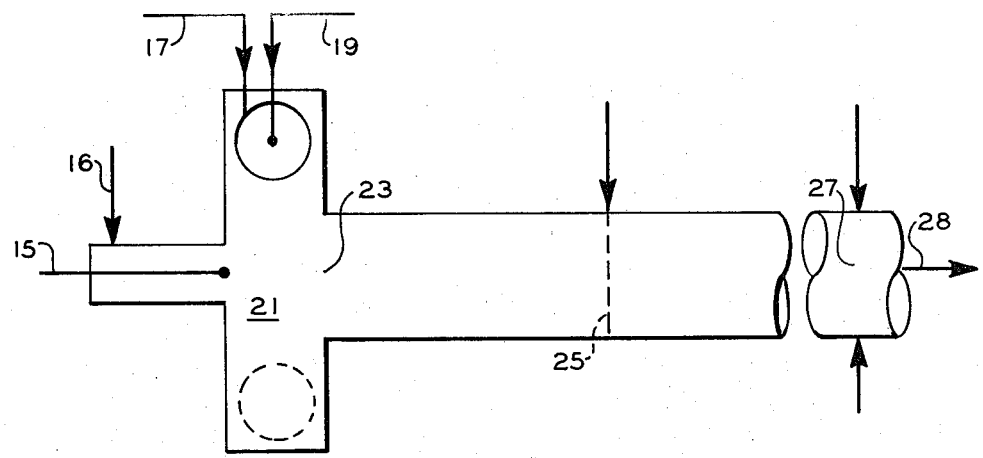
FIG. 3 is a typical carbon black reactor using the apparatus and method of this invention as a prequench.

In FIG. 3 the use of quench fluid introduced through a quench pipe of the present invention to prequench, or reduce the temperature of reacting feed and combustion gases sufficiently to stop carbon black formation, is illustrated. It should be noted that the use of the inventive quench pipe is not limited to carbon black production nor is it limited when used in carbon black production for use in a reactor similar to the one illustrated. The present invention is useful in any process or apparatus in which bypassing of axial flow through voids in a curtain of quench fluid is to be avoided.

In FIG. 3, reaction feedstock which can be any carbonaceous material that can be converted to carbon black, enters through line 15. Oil tube or nozzle cooling air is added at 16. Air and fuel enter through line 17 and 19, respectively, to be mixed and combusted, and hot combustion gases are introduced tangentially into the precombustion zone 21 where the hot combustion gases are admixed with the feedstock and passed to the reaction zone 23 where conversion of the feedstock to produce carbon black takes place. The reaction mass which is a "smoke", comprising carbon black and hot combustion gases, at about 2600° F. passes through the reaction tube to a prequench zone 25 equipped with a quench pipe as discussed above.

In the prequench zone the generally axially flowing reaction product is passed through a curtain of quench fluid, generally water, distributed in a spray pattern generally transverse the axial flow of the reactant material. That portion of the axially flowing material that under the prior art would have passed through voids in the spray curtain is directed (see FIG. 1) by baffle means 7 into the patterned spray 5 so that there is an even cooling of the particulate material to at least as low as 2000° F. thereby stopping the formation of carbon black. This cooling should produce a carbon black particle of sufficient uniformity to provide a carbon black having higher tinting strength than could be realized using a quenching method of the prior art which allowed some of the carbon black material to bypass the prequenching fluid.

Subsequent to the prequench the axially flowing material passes through a final quenching or cooling step at 27, which can also entail the use of a quench pipe of the present invention, which cools the carbon black and the gases entraining the carbon black to a temperature of 1200° F. or less and prepares it for further handling outside of the reactor. The reactor effluent is removed at 28.

Figure 4:
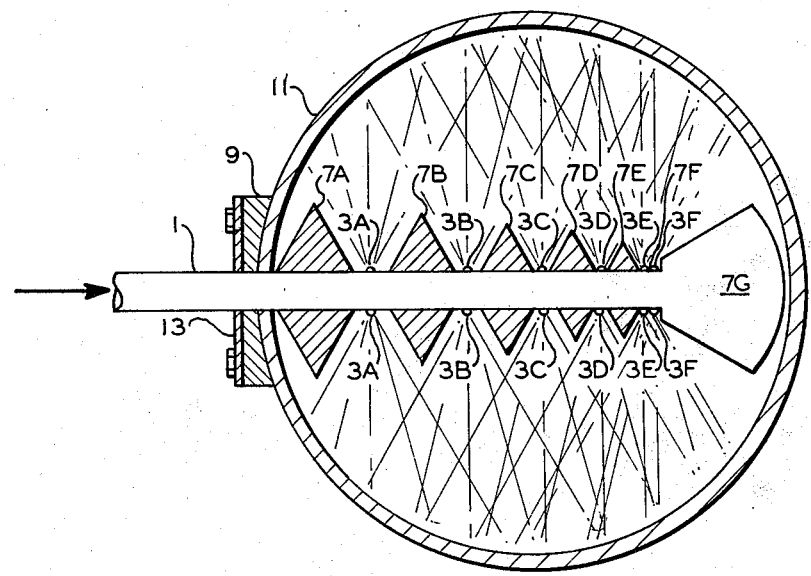
FIG. 4 is a cross section of a reactor showing baffles on a quench pipe for a calculated example of this invention.

FIG. 4 describes the baffles used on a quench pipe for a calculated example that follows. In FIG. 4 the alignment on quench pipe 1 describes the quench orifices as 3A-F and describes baffle means between the orifices as 7A-G. The example describes flow through a carbon black apparatus as set forth in FIG. 3 with operation using a prequench pipe without baffles, as known in the prior art, and with baffles, by the process and using the apparatus of this invention.

It is well known that high tint strength carbon black will result when the most uniform nodules or particles of carbon black are produced. The baffles of the invention minimize the by-passing of the quench fluid by the smoke, thus insuring that the most uniform nodules are produced. Substantially all of the carbon black particles or nodules are quenched at the same reaction time by the quench means, with baffles, of the invention, insuring uniform quality throughout the distribution of particles or nodules of carbon black.

| Typical Operation of Carbon Black Reactor | | |
|---|---|---|
| Reaction Vessel: | Without Baffles | With Baffles |
| Precombustion Zone: | | |
| Diameter, inches, (internal) | 39 (99.06 cm) | 39 (99.06 cm) |
| Length, inches, (internal) | 12 (30.48 cm) | 12 (30.48 cm) |
| Reaction Conduit: | | |
| Length, inches, (internal) | 112 (284.48 cm) | 112 (284.48 cm) |
| Diameter, inches, (internal) | 15 (38.10 cm) | 15 (38.10 cm) |
| (a)Length to Prequench, inches | 48 (121.92 cm) | 48 (121.92 cm) |
| (b)Length to Final Quench, inches | 112 (284.48 cm) | 112 (284.48 cm) |

(a)Prequench pipes can be selected, e.g., at 36" (91.44 cm) from reactor tube inlet, at 42" (106.68 cm) or 48" (121.92 cm). The invention is shown at the 48 inch locus.
(b)Reactor length is defined as the distance from the inlet of the reactor to the final quench.

| Operation: | | |
|---|---|---|
| Make Oil: | | |
| BMCI Value | 120 | 120 |
| Mid-Boiling Point | 700° F. (371.1° C.) | 700° F. (371.1° C.) |
| Gallons/hr. | 325 (1230.13 liters/hr.) | 325 (1230.13 liters/hr.) |

-continued

| Operation: | | |
|---|---|---|
| Tangential Air: | | |
| SCF/hr. | 210,000 (5950.69 m³/hr.) | 210,000 (5950.69 m³/hr.) |
| Tangential Fuel Gas: | | |
| Btu/SCF. | 1000 | 1000 |
| SCF/hr. | 13,680 (387.65 m³/hr.) | 13,680 (387.65 m³/hr.) |
| Axial Air: | | |
| SCF/hr. | 4000 (113.35 m³/hr.) | 4000 (113.35 m³/hr.) |
| Prequench Water: | | |
| Temperature, °F. | 100° F. (37.8° C.) | 100° F. (37.8° C.) |
| Gallons/hr. | 175 (662.4 liters/hr.) | 175 (662.4 liters/hr.) |
| (This quenches the smoke to about 2000° F. so that no further carbon black forming reaction occurs.) | | |
| Final Quench Water: | | |
| Temperature, °F. | 100° F. (37.8° C.) | 100° F. (37.8° C.) |
| Gallons/hr. | 450 (1703.25 liters/hr.) | 450 (1703.25 liters/hr.) |
| | ESTIMATED VALUES | |
| Carbon Black Final Product: | Without Baffles | With Baffles |
| $N_2SA$, $m^2/gm$[1] | 99 | 99 |
| CTAB, $m^2/gm$[2] | 100 | 100 |
| 24M4DBP, cc 100 gm[3] | 101 | 101 |
| Photoelometer[4] | 86 | 86 |
| Tinting Strength[5] | 105 | 108 |
| The Prequench Tube: | | |
| External Diameter, inches | 11/16 (1.746 cm.) | 11/16 (1.746 cm.) |
| Internal diameter, inches | 7/16 (1.111 cm.) | 7/16 (1.111 cm.) |
| Diameter of Orifices, inches | 1/16 (0.159 cm.) | 1/16 (0.159 cm.) |
| Spacing of Orifices: | | |
| First set (180° apart) from inside of reactor wall, adjacent the water inlet end, inches, 4½ (11.43 cm.) | 4½ (11.43 cm.) | |
| Second set from first, inches 1¾ (4.45 cm.) | 1¾ (4.45 cm.) | |
| Third set from second, inches 1½ (3.81 cm.) | 1½ (3.81 cm.) | |
| Fourth set from third, inches | 1¼ (3.18 cm.) | 1¼ (3.18 cm.) |
| Fifth set from fourth, inches | 1 (2.54 cm.) | 1 (2.54 cm.) |
| Sixth set from fifth, inches | ½ (1.27 cm.) | ½ (1.27 cm.) |
| Distance of sixth orifice from reactor adjacent wall, inches | 4½ (11.43 cm.) | 4½ (11.43 cm.) |
| Baffle means (Equilateral Triangles) | [No baffles are used] | [Baffles are used] |
| Centered between wall and first set of orifices inches on side, 7A | — | 4 (10.16 cm.) |
| Between second and first set, inches on side, 7B | — | 1¼ (3.18 cm.) |
| Between third and second set, inches on side, 7C | — | 1 (2.54 cm.) |
| Between fourth and third set, inches on side, 7D | — | ¾ (1.91 cm.) |
| Between fifth and fourth set, inches on side, 7E | — | ¾ (1.91 cm.) |
| Between sixth and fifth set, inches on side, 7F | — | None used |
| "Parallelogram" shaped baffle on end of Tube,[c] 7G | | |
| Short side, inches | — | ¾ (1.91 cm.) |
| Long side, inches | — | 4 (10.16 cm.) |
| Length, inches | — | 4 (10.16 cm.) |

[1] ASTM D-3037-71T (Method A)
[2] Janzen, J. and Kraus, G., Rubber Chemistry and Technology, 44, 1287 ('71)
[3] ASTM D-3493-76
[4] ASTM D-1618-58T
[5] ASTM D-3265-75
[c] Curved at outer or long side to fit curvature of reactor wall.

I claim:
1. A quench pipe comprising:
   (1) a plurality of discharge openings along its length arranged as two longitudinally spaced sets 180° apart to produce a patterned fluid spray with spaces between said openings which are void of spray;
   (2) means for inserting said quench pipe into a quench zone so that fluid is discharged from the pipe generally transversely across the quench zone; and
   (3) baffle plates aligned on said quench pipe between said discharge openings, said plates of sufficient size, shape and placement substantially to fill spaces between said patterned spray so that axial flow through the quench zone is directed into the patterned spray.

2. Apparatus for producing carbon black in a reacting vessel comprising:

(1) means by which feed and combustion gases are mixed in a precombustion zone to produce a combustion mixture;

(2) means by which said combustion mixture is passed to a reaction zone under conditions for carbon black formation;

(3) downstream of said reaction zone at least one quench pipe according to claim 1;

(4) a means for removing quenched reaction product from the reactor.

3. Apparatus according to claim 2 wherein downstream of said quench pipe there is at least one additional means for quenching said reaction product.

4. An apparatus of claim 3 wherein said additional means for quenching is a quench pipe according to claim 1.

* * * * *